(12) United States Patent
Koike

(10) Patent No.: US 9,735,985 B2
(45) Date of Patent: Aug. 15, 2017

(54) MOBILE STATION AND METHOD FOR MEASURING RECEPTION QUALITY

(71) Applicant: FUJITSU LIMITED, Kawasaki-shi, Kanagawa (JP)

(72) Inventor: Chimato Koike, Fujisawa (JP)

(73) Assignee: FUJITSU LIMITED, Kawasaki (JP)

( * ) Notice: Subject to any disclaimer, the term of this patent is extended or adjusted under 35 U.S.C. 154(b) by 366 days.

(21) Appl. No.: 14/493,477

(22) Filed: Sep. 23, 2014

(65) Prior Publication Data

US 2015/0109944 A1    Apr. 23, 2015

(30) Foreign Application Priority Data

Oct. 17, 2013    (JP) .................................. 2013-216599

(51) Int. Cl.
*H04W 24/08*    (2009.01)
*H04L 25/02*    (2006.01)
*H04J 11/00*    (2006.01)

(52) U.S. Cl.
CPC ........ *H04L 25/0202* (2013.01); *H04J 11/005* (2013.01); *H04J 11/0046* (2013.01)

(58) Field of Classification Search
CPC ... H04W 24/08; H04W 88/02; H04J 11/0005; H04J 11/0046; H04L 25/0202
See application file for complete search history.

(56) References Cited

U.S. PATENT DOCUMENTS

2009/0196203 A1    8/2009    Taira et al.

2009/0219876 A1    9/2009    Kimura et al.
(Continued)

FOREIGN PATENT DOCUMENTS

| JP | 2009-206945 | 9/2009 |
|---|---|---|
| JP | 2012-156798 | 8/2012 |
| JP | 2013-009224 | 1/2013 |
| WO | 2008/004609 | 1/2008 |

OTHER PUBLICATIONS

Ming Huang et al., "Macro-Femto Inter-Cell Interference Mitigation for 3GPP LTE-A Downlink," WCNC 2012 Workshop on Broadband Femtocell Technologies, pp. 75-80 (7 pages).
(Continued)

*Primary Examiner* — Noel Beharry
*Assistant Examiner* — Ruihua Zhang
(74) *Attorney, Agent, or Firm* — Fujitsu Patent Center

(57) ABSTRACT

A mobile station includes a calculation unit, an adjustment unit, an estimation unit, and a measurement unit. The calculation unit calculates a weighting matrix for use in channel estimation of an interfering cell. The adjustment unit adjusts values of respective components of the weighting matrix calculated by the calculation unit so that out of the respective components, diagonal components are smaller than components other than the diagonal components. The estimation unit suppresses a noise component included in a value of the channel estimation by using the weighting matrix whose respective component values were adjusted by the adjustment unit so as to perform the channel estimation of the interfering cell. The measurement unit cancels a signal of the interfering cell from a received signal based on a result of the channel estimation and measures a reception quality of a measurement target cell with respect to the received signal.

8 Claims, 9 Drawing Sheets

(56) References Cited

U.S. PATENT DOCUMENTS

| | | | | |
|---|---|---|---|---|
| 2009/0303979 | A1* | 12/2009 | Hottinen | H04L 5/0037 |
| | | | | 370/345 |
| 2010/0008412 | A1* | 1/2010 | Ito | H04B 1/707 |
| | | | | 375/232 |
| 2010/0046661 | A1* | 2/2010 | Yoshida | H04B 1/71052 |
| | | | | 375/285 |
| 2011/0111747 | A1* | 5/2011 | Tosato | H04B 7/0434 |
| | | | | 455/422.1 |
| 2014/0369219 | A1* | 12/2014 | Wang | H04B 7/024 |
| | | | | 370/252 |

OTHER PUBLICATIONS

3GPP TS 36.211 v11.3.0 (Jun. 2013) 3rd Generation Partnership Project; Technical Specification Group Radio Access Network; Evolved Universal Terrestrial Radio Access (E-UTRA); Physical Channels and Modulation (Release 11) (108 pages).

3GPP TS 36.214 v11.1.0 (Dec. 2012) 3rd Generation Partnership Project; Technical Specification Group Radio Access Network; Evolved Universal Terrestrial Radio Access (E-UTRA); Physical Layer; Measurements (Release 11) (14 pages).

3GPP TS 36.300 v11.6.0 (Jun. 2013) 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 11) (209 pages).

* cited by examiner

| NO-INTERFERENCE | CRS-IC | FIRST EMBODIMENT | SECOND EMBODIMENT |
|---|---|---|---|
| 97.0 % | 89.5 % | 94.2 % | 94.4 % |

MOBILE STATION AND METHOD FOR MEASURING RECEPTION QUALITY

CROSS-REFERENCE TO RELATED APPLICATION

This application is based upon and claims the benefit of priority of the prior Japanese Patent Application No. 2013-216599, filed on Oct. 17, 2013, the entire contents of which are incorporated herein by reference.

FIELD

The embodiments discussed herein are related to a mobile station and a method for measuring a reception quality.

BACKGROUND

In recent years, the LTE-Advanced, which is a major enhancement of the Long Term Evolution (LTE) standard, is being developed with advancement of the wireless communication technology. The LTE-Advanced is assumed to use a Heterogeneous Network (HetNet) in which a macro cell covering a large area and femtocells covering small areas coexist in the same frequency band. FIG. 8 illustrates a cell configuration of the HetNet. As illustrated in FIG. 8, the HetNet is configured such that a plurality of femtocells C12 and C13 covering small areas are included in a macro cell C11 covering a large area, the femtocells using the frequency band same as the macro cell. In the LTE-Advanced, an Orthogonal Frequency Division Multiplexing (OFDM) technology is used for downlink (DL) communication from a base station to a mobile station. When the mobile station receives a signal in a femtocell, reception quality may degrade due to interference from the macro cell.

Accordingly, a technology called enhanced Inter-Cell Interference Coordination (eICIC) is introduced to reduce inter-cell interference. The eICIC involves coordination between the macro cell and the femtocells. During part of subframes, transmission of a data signal from the macro cell is stopped so as to reduce interference. The subframe during which transmission of the data signal from macro cell is stopped is referred to as Almost Blank Subframe (ABS), which improves the reception quality of the mobile station connected to the femtocell.

However, in the eICIC, it is impossible for mobile stations other than the mobile station connected to the femtocell to receive data signals from the macro cell during the ABS. Accordingly, a technology has been introduced in the Release-11 and onward of the LTE-Advanced. According to the technology, the macro cell does not completely stop data signal transmission during the ABS but transmits a signal by using electric power lower than normal power. This technology is called Further-enhanced Inter-Cell Interference Coordination (FeICIC). The FeICIC prevents communications of the mobile stations connected to the macro cell from being interrupted by the communications performed between other mobile stations and the femtocells.

While the FeICIC reduces inter-cell interference, a Cell-specific Reference Signal (CRS) in a subframe is normally transmitted when interference control is performed by using the ABS. The CRS is a signal which identifies each base station. Placement of the CRS changes depending on the ID of the cell formed by each base station. Accordingly, interference does not generally occur between the CRSs. However, a CRS is placed at intervals of 6 sub carriers (SCs) over several symbols in a subframe. If the cells have the same reminder when each cell ID is divided by 6, the CRSs of these cells are mapped to the same position, then interference occurs. As a result, CRS reception quality degrades.

A reference signal received power (RSRP) is one of the indices indicating the reception quality. Since the RSRP is an average received signal power of the CRSs, the CRSs are used to measure the RSRP. Accordingly, the above-described degradation in CRS reception quality causes degradation in accuracy of RSRP measurement. CRS-interference cancellation (IC) is one of the technologies to improve CRS reception quality. According to the CRS-IC technology, the CRS reception quality can be improved by cancelling the CRS of interfering cells from a received signal of the mobile station so as to obtain a signal which does not include interference components. By using the CRS-IC, the degradation in RSRP measurement accuracy can also be suppressed.

Non-patent Document 1: 3GPP LTE Specifications, TS36.211-v.11.3.0.

Non-patent Document 2: 3GPP LTE Specifications, TS36.214-v.11.1.0.

Non-patent Document 3: 3GPP LTE Specifications, TS36.300-v.11.6.0.

Non-patent Document 4: "Macro-Femto Inter-Cell, Interference Mitigation for 3GPP LTE-A Downlink," M. Huang and W. Xu, WCNC 2012 Workshop on Broadband Femtocell Technologies.

However, it is still difficult to measure the precise RSRP even by the above-described method for measuring RSRP with CRS-IC because of the following reason. That is, when measuring the RSRP, a mobile station subtracts a replica signal of interfering cells from signal components of a received signal. In this process, the mobile station sometimes subtracts part of the signal components of a measurement target cell. As a consequence, part of the RSRP that is originally included in the measurement target is excluded therefrom, so that an RSRP value smaller than an actual value (hereinafter described as "ideal value") is calculated. As a result, the RSRP measurement accuracy may degrade.

The requirement of RSRP measurement accuracy in the 3rd Generation Partnership Project (3GPP) specifies that 90% or more of RSRP measurement values are to be included in a fixed range of the ideal value in an Additive White Gaussian Noise (AWGN) propagation environment. If there is a tendency that the RSRP is calculated smaller than the ideal value when the RSRP is measured by using the CRS-IC, it may be difficult to satisfy the requirement, which poses a problem.

In the above described RSRP measuring method using the CRS-IC, part of the RSRP that is included in the measurement target is excluded therefrom. As a result, an RSRP value lower than an actual value is reported from the mobile station to its base station. This leads to the situations where proper handover is not performed, such as the handover being untimely performed, and the handover being performed too frequently. As a result, the mobile station has a degraded reception quality and/or has an unstable connection to the base station.

SUMMARY

According to an aspect of the embodiments, a mobile station includes: a calculation unit that calculates a weighting matrix for use in channel estimation of an interfering cell; an adjustment unit that adjusts values of respective components of the weighting matrix calculated by the calculation unit so that out of the respective components, diagonal components are smaller than components other than the diagonal components; an estimation unit that suppresses a noise component included in a value of the channel estimation by using the weighting matrix whose respective component values were adjusted by the adjustment unit so as to perform the channel estimation of the interfering cell; and a measurement unit that cancels a signal of the interfering cell from a received signal based on a result of the channel estimation by the estimation unit and measures a reception quality of a measurement target cell with respect to the received signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The following embodiments are not intended to limit the mobile station and the method for measuring a reception quality disclosed in this application.

[a] First Embodiment

Figure 1:
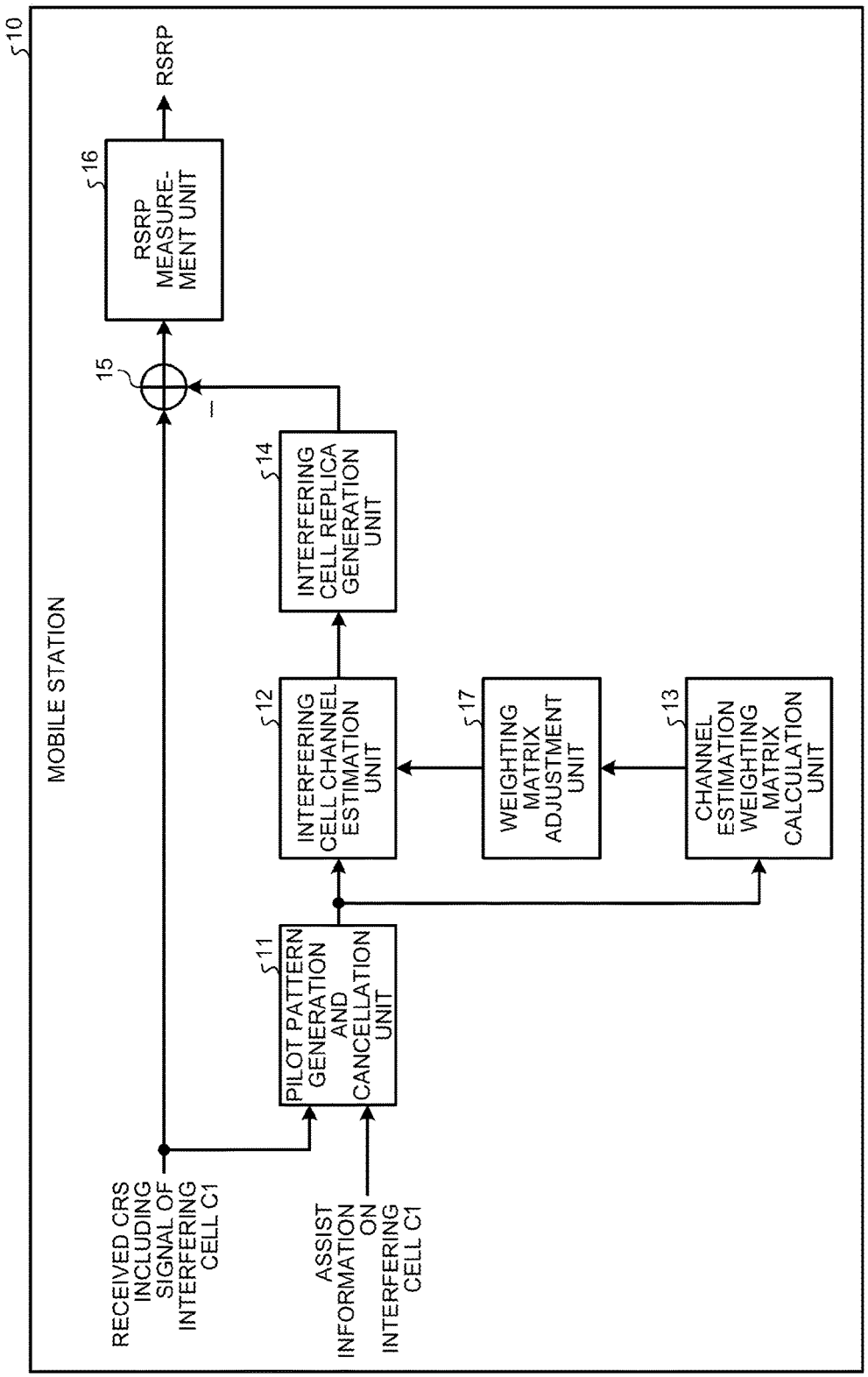
FIG. 1 is a block diagram illustrating a functional configuration of a mobile station according to a first embodiment.

A description will now be given of the configuration of a mobile station according to one embodiment disclosed in this application. FIG. 1 is a block diagram illustrating the functional configuration of a mobile station 10 according to the first embodiment. As illustrated in FIG. 1, the mobile station 10 includes a pilot pattern generation and cancellation unit 11, an interfering cell channel estimation unit 12, a channel estimation weighting matrix calculation unit 13, an interfering cell replica generation unit 14, a received signal calculation unit 15, an RSRP measurement unit 16, and a weighting matrix adjustment unit 17. These respective component members are connected so that signals and data can be input and output in one way or two-way direction.

The pilot pattern generation and cancellation unit 11 uses assist information (for example, cell ID, the number of transmission antennas, etc.) of an interfering cell C1 to generate a CRS (pilot pattern) matrix $X_2$ of the interfering cell C1, and multiplies a received signal vector y by a Hermitian transpose matrix of the matrix $X_2$. This processing is called Zero-Forcing, which does not have an effect of suppressing a noise component.

The interfering cell channel estimation unit 12 suppresses a noise component in a channel estimation value after Zero-Forcing, so as to obtain a channel estimation value with a higher precision. A detailed description will be given below.

As a technology of estimating the channel of the interfering cell C1, there is a method of weighing and averaging channel estimation values of a plurality of subcarriers after Zero-Forcing. Here, channel estimation values of N subcarriers after Zero-Forcing are expressed by the following expression (1). The following expression (2) provides weight coefficients to be multiplied by channel estimation values of N subcarriers after Zero-Forcing in order to calculate a weighted and averaged channel estimation value of a subcarrier #1.

$$\tilde{h}_{ZF}(0), \tilde{h}_{ZF}(1), \ldots, \tilde{h}_{ZF}(N-1) \tag{1}$$

$$w_{1,0}, w_{1,1}, \ldots, w_{1,N-1} \tag{2}$$

Figure 2:
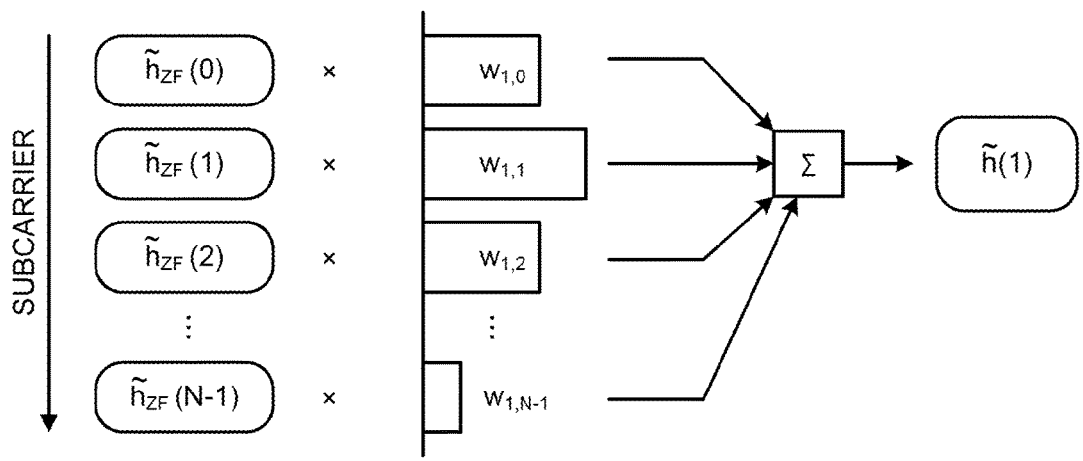
FIG. 2 illustrates the relation between subcarriers and weight coefficients.

FIG. 2 illustrates the relation between subcarriers and weight coefficients. FIG. 2 represents a process of calculating the weighted and averaged channel estimation value of the subcarrier #1. As illustrated in FIG. 2, the interfering cell channel estimation unit 12 multiplies the respective channel estimation values after Zero-Forcing by the weight coefficients of N subcarriers, and calculates a sum of respective multiplication results to achieve suppression of the noise component.

The weighted and averaged channel estimation value of the subcarrier #k is expressed by the following expression (3):

$$\tilde{h}(k) = \sum_{i=0}^{N-1} w_{k,i} \tilde{h}_{ZF}(i). \tag{3}$$

For example, the weighted and averaged channel estimation value of the subcarrier #1 is expressed by the following expression (4):

$$\tilde{h}(1) = \sum_{i=0}^{N-1} w_{1,i} \tilde{h}_{ZF}(i). \tag{4}$$

The channel estimation values of N subcarriers after Zero-Forcing and the channel estimation values of N subcarriers after weighting and averaging are each expressed as a vector by the following expression (5):

$$\tilde{h}_{ZF} = \begin{pmatrix} \tilde{h}_{ZF}(0) \\ \tilde{h}_{ZF}(1) \\ \vdots \\ \tilde{h}_{ZF}(N-1) \end{pmatrix}, \tilde{h} = \begin{pmatrix} \tilde{h}(0) \\ \tilde{h}(1) \\ \vdots \\ \tilde{h}(N-1) \end{pmatrix}. \tag{5}$$

Weights to be multiplied by the channel estimation values of N subcarriers after Zero-Forcing in order to calculate weighted and averaged channel estimation values of all the subcarriers are expressed in the form of a matrix by the following expression (6):

$$W = \begin{pmatrix} w_{0,0} & w_{0,1} & \cdots & w_{0,N-1} \\ w_{1,0} & w_{1,1} & \cdots & w_{1,N-1} \\ \vdots & \vdots & \ddots & \vdots \\ w_{N-1,0} & w_{N-1,1} & \cdots & w_{N-1,N-1} \end{pmatrix}. \quad (6)$$

The relation between the weight coefficients and the weighting matrix in this case is expressed by the following expression (7):

$$W = \begin{pmatrix} W_{0,0} & W_{0,1} & \cdots & W_{0,N-1} \\ W_{1,0} & W_{1,1} & \cdots & W_{1,N-1} \\ \vdots & \vdots & \ddots & W_{N-1,N-1} \\ W_{N-1,0} & W_{N-1,1} & \cdots & \end{pmatrix}. \quad (7)$$

The weighted and averaged channel estimation value is expressed by the following expression (8):

$$\tilde{h} = W\tilde{h}_{ZF} \quad (8).$$

The weighting matrix for channel estimation may be calculated by, for example, a minimum mean square error (MMSE) estimator. The weight coefficients are generally set so that a calculation target subcarrier has a largest weight and other subcarriers have smaller weights as they are away from the calculation target subcarrier. However, when the propagation path is flat in a frequency direction, all the weight coefficients may be identical.

The RSRP measuring method using CRS-IC will now be analyzed. When the CRS and the channel of a measurement target cell on a reference signal (RS) subcarrier #k are set to $x_{1,k}$ and $h_{1,k}$, respectively, the CRS and the channel of an interfering cell C1 are set to $X_{2,k}$ and $h_{2,k}$, respectively, and noise is set to $n_k$, a received signal $y_k$ is expressed by the following expression (9):

$$y_k = x_{1,k} h_{1,k} + x_{2,k} h_{2,k} + n_k \quad (9).$$

To collectively handle a plurality of subcarriers, the expression (9) is expressed in the form of a matrix as in the following expression (10), where N denotes the number of subcarriers.

$$\begin{bmatrix} y_0 \\ y_1 \\ \vdots \\ y_{N-1} \end{bmatrix} = \begin{bmatrix} x_{1,0} & 0 & \cdots & 0 \\ 0 & x_{1,1} & \cdots & 0 \\ \vdots & \vdots & \ddots & \vdots \\ 0 & 0 & \cdots & x_{1,N-1} \end{bmatrix} \begin{bmatrix} h_{1,0} \\ h_{1,1} \\ \vdots \\ h_{1,N-1} \end{bmatrix} + \begin{bmatrix} x_{2,0} & 0 & \cdots & 0 \\ 0 & x_{2,1} & \cdots & 0 \\ \vdots & \vdots & \ddots & \vdots \\ 0 & 0 & \cdots & x_{2,N-1} \end{bmatrix} \begin{bmatrix} h_{2,0} \\ h_{2,1} \\ \vdots \\ h_{2,N-1} \end{bmatrix} + \begin{bmatrix} n_0 \\ n_1 \\ \vdots \\ n_{N-1} \end{bmatrix} \quad (10)$$

When respective matrices and vectors in the expression (10) are expressed in the form of the following expression (11), the expression (10) is expressed as in the following expression (12).

$$y = \begin{bmatrix} y_0 \\ y_1 \\ \vdots \\ y_{N-1} \end{bmatrix}, X_1 = \begin{bmatrix} x_{1,0} & 0 & \cdots & 0 \\ 0 & x_{1,1} & \cdots & 0 \\ \vdots & \vdots & \ddots & \vdots \\ 0 & 0 & \cdots & x_{1,N-1} \end{bmatrix}, h_1 = \begin{bmatrix} h_{1,0} \\ h_{1,1} \\ \vdots \\ h_{1,N-1} \end{bmatrix}, \quad (11)$$

$$X_2 = \begin{bmatrix} x_{2,0} & 0 & \cdots & 0 \\ 0 & x_{2,1} & \cdots & 0 \\ \vdots & \vdots & \ddots & \vdots \\ 0 & 0 & \cdots & x_{2,N-1} \end{bmatrix}, h_2 = \begin{bmatrix} h_{2,0} \\ h_{2,1} \\ \vdots \\ h_{2,N-1} \end{bmatrix}, n = \begin{bmatrix} n_0 \\ n_1 \\ \vdots \\ n_{N-1} \end{bmatrix}$$

$$y = X_1 h_1 + X_2 h_2 + n \quad (12)$$

Then, the pilot pattern generation and cancellation unit 11 multiplies the received signal vector y by the Hermitian transpose matrix of the CRS matrix $X_2$ of the interfering cell C1 to perform Zero-Forcing. The channel estimation value after Zero-Forcing is expressed by the following expression (13):

$$\tilde{h}_{2,ZF} = X_2^H y \quad (13)$$
$$= X_2^H (X_1 h_1 + X_2 h_2 + n)$$
$$= h_2 + X_2^H (X_1 h_1 + n).$$

In the expression (13), it is assumed that transmission power per CRS subcarrier is equal to "1" as the following expression (14).

$$X_2^H X_2 = I \quad (14)$$

The interfering cell channel estimation unit 12 performs averaging among the subcarriers by using the following expression (15) so as to suppress the noise component included in the channel estimation value.

$$\tilde{h}_2 = W\tilde{h}_{2,ZF} \quad (15)$$
$$= Wh_2 + WX_2^H(X_1 h_1 + n)$$

The channel estimation weighting matrix calculation unit 13 calculates a channel estimation weighting matrix W expressed by the following expression (16):

$$W = \begin{bmatrix} w_{0,0} & w_{0,1} & \cdots & w_{0,N-1} \\ w_{1,0} & w_{1,1} & \cdots & w_{1,N-1} \\ \vdots & \vdots & \ddots & \vdots \\ w_{N-1,0} & w_{N-1,1} & \cdots & w_{N-1,N-1} \end{bmatrix}. \quad (16)$$

Here, the averaged channel estimation value of the RS subcarrier #k is expressed by the following expression (17):

$$\tilde{h}_2(k) = \sum_{i=0}^{N-1} w_{k,i} \tilde{h}_{2,ZF}(i). \quad (17)$$

Next, the interfering cell replica generation unit 14 multiplies the channel estimation value by the CRS pattern of the interfering cell C1 to generate a replica $r_2$ of the signal of the interfering cell C1. The replica $r_2$ is expressed by the following expression (18):

$$r_2 = X_2 \tilde{h}_2 \qquad (18)$$
$$= X_2(Wh_2 + WX_2^H(X_1 h_1 + n))$$
$$= X_2 W h_2 + X_2 W X_2^H(X_1 h_1 + n).$$

Next, the received signal calculation unit 15 subtracts the replica $r_2$ from the original received signal y to obtain a received signal vector z which does not include an interference signal. The received signal vector z is expressed by the following expression (19):

$$z = y - r_2 \qquad (19)$$
$$= (X_1 h_1 + X_2 h_2 + n) - \{X_2 W h_2 + X_2 W X_2^H(X_1 h_1 + n)\}$$
$$= (I - X_2 W X_2^H)(X_1 h_1 + n) + X_2(I - W)h_2.$$

The RSRP measurement unit 16 cancels the CRS pattern of the measurement target cell and performs Zero-Forcing to obtain a channel estimation value. More specifically, the RSRP measurement unit 16 multiplies the received signal vector z, which does not include an interference signal, by the Hermitian transpose matrix of the CRS matric of the measurement target cell as expressed in the following expression (20):

$$\tilde{h}_{1,ZF} = X_1^H z \qquad (20)$$
$$= X_1^H \{(I - X_2 W X_2^H)(X_1 h_1 + n) + X_2(I - W)h_2\}$$
$$= X_1^H(I - X_2 W X_2^H)X_1 h_1 + X_1^H X_2(I - W)h_2 +$$
$$X_1^H(I - X_2 W X_2^H)n.$$

In the expression (20), it is assumed that transmission power per CRS subcarrier is equal to "1" as the following expression (21).

$$X_1^H X_1 = I \qquad (21)$$

Next, the RSRP measurement unit 16 averages the calculation results by the expression (20) over a plurality of OFDM symbols by using the following expression (22). As a result, the noise component included in the channel estimation value is suppressed.

$$\tilde{h}_1 = \langle \tilde{h}_{1,ZF} \rangle_{n, X_1, X_2} \qquad (22)$$
$$= \langle X_1^H(I - X_2 W X_2^H)X_1 h_1 + X_1^H X_2(I - W)h_2 +$$
$$X_1^H(I - X_2 W X_2^H)n \rangle_{n, X_1, X_2}$$
$$= \langle X_1^H(I - X_2 W X_2^H)X_1 h_1 \rangle_{X_1, X_2} + \langle X_1^H X_2(I - W)h_2 \rangle_{X_1, X_2} +$$
$$\langle X_1^H(I - X_2 W X_2^H)n \rangle_{n, X_1, X_2}$$
$$= (I - \langle X_1^H X_2 W X_2^H X_1 \rangle_{X_1, X_2})h_1 + \langle X_1^H \rangle_{X_1} \langle X_2 \rangle_{X_2}(I - W)h_2 +$$
$$\langle X_1^H \rangle_{X_1} \langle I - X_2 W X_2^H \rangle_{X_2} \langle n \rangle_n$$
$$= (I - \Omega)h_1$$

Here, the term $\langle \ \rangle_{n, X_1, X_2}$ indicates that the variables enclosed in $\langle \ \rangle$ are averaged by regarding n, $X_1$, and $X_2$ as random variables while other variables as constants in a sufficiently long period. The variables n, $X_1$, and $X_2$ are independent variables. Their average values are all 0 as expressed in the following expression (23):

$$\langle X_1^H \rangle_{x_1} = \langle X_2 \langle_{x_2} = \rangle n \rangle_n = 0 \qquad (23).$$

Furthermore, the RSRP measurement unit 16 calculates $\Omega$ as defined in (24). In the following expression, diagW represents a matrix in which values other than diagonal component values of the matrix W are set to 0.

$$\langle X_1^H X_2 W X_2^H X_1 \rangle_{X_1, X_2} = \left\langle \begin{pmatrix} x_{1,0}^* x_{2,0} & \cdots & 0 \\ \vdots & \ddots & \vdots \\ 0 & \cdots & x_{1,N-1}^* x_{2,N-1} \end{pmatrix} \right. \qquad (24)$$
$$\begin{pmatrix} w_{0,0} & \cdots & w_{0,N-1} \\ \vdots & \ddots & \vdots \\ w_{N-1,0} & \cdots & w_{N-1,n-1} \end{pmatrix}$$
$$\left. \begin{pmatrix} x_{1,0}^* x_{2,0} & \cdots & 0 \\ \vdots & \ddots & \vdots \\ 0 & \cdots & x_{1,N-1} x_{2,N-1}^* \end{pmatrix} \right\rangle_{x_{1,k} x_{2,k}}$$
$$= \left\langle \begin{pmatrix} |x_{1,0}|^2 |x_{2,0}|^2 w_{0,0} & x_{1,0}^* x_{2,0} w_{0,1} x_{1,1} x_{2,1}^* & \cdots & x_{1,0}^* x_{2,0} w_{0,N-1} x_{1,N-1} x_{2,N-1}^* \\ x_{1,1}^* x_{2,1} w_{1,0} x_{1,0} x_{2,0}^* & |x_{1,1}|^2 |x_{2,1}|^2 w_{1,1} & \cdots & x_{1,1}^* x_{2,1} w_{1,N-1} x_{1,N-1} x_{2,N-1}^* \\ \vdots & \vdots & \ddots & \vdots \\ x_{1,N-1}^* x_{2,N-1} w_{N-1,0} x_{1,0} x_{2,0}^* & x_{1,N-1}^* x_{2,N-1} w_{N-1,1} x_{1,1} x_{2,1}^* & \cdots & |x_{1,N-1}|^2 |x_{2,N-1}|^2 w_{N-1,N-1} \end{pmatrix} \right\rangle_{x_{1,k} x_{2,k}}$$
$$= \begin{bmatrix} w_{0,0} & \cdots & 0 \\ \vdots & \ddots & \vdots \\ 0 & \cdots & w_{N-1,N-1} \end{bmatrix}$$
$$= \text{diag} W$$
$$= \Omega$$

The RSRP measurement unit 16 calculates a power value from expressions (22) by using the following expression (25):

$$P_{est} = \frac{1}{N}\tilde{h}_1^H \tilde{h}_1 \qquad (25)$$
$$= \frac{1}{N} h_1^H (I-\Omega)^H (I-\Omega) h_1.$$

Since RSRP represents electric power in the units of dB, $RSRP_{est}$ which represents the value of RSRP measured by using the CRS-IC is expressed by the following expression (26):

$$RSRP_{est} = 10 \log_{10} P_{est} \qquad (26).$$

For the analysis of RSRP, an ideal power value $P_{ideal}$ is calculated by the following expression (27) with use of the ideal channel value which does not include noise.

$$P_{ideal} = \frac{1}{N} h_1^H h_1 \qquad (27)$$

Therefore, the value of $RSRP_{ideal}$ which is an ideal value of RSRP is expressed by the following expression (28):

$$RSRP_{ideal} = 10 \log_{10} P_{ideal} \qquad (28).$$

When the expression (25) and the expression (27) are compared, the power value $P_{est}$ measured by using the CRS-IC is smaller by $(I-\Omega)^H (I-\Omega)$ than the ideal value $P_{ideal}$. Since $\Omega$ represents a diagonal component of the weighting matrix for use in channel estimation of the interfering cell C1, the RSRP measurement unit 16 can approximate the power value $P_{est}$ to the ideal value $P_{ideal}$ by setting the diagonal component value as small as possible (for example, 0). A detailed description thereof will be given below.

In the expression (18), the following expression (29) is satisfied for a given RS subcarrier #k.

$$r_{2,k} = x_{2,k} \sum_{i=0}^{N-1} w_{k,i} h_{2,i} + x_{2,k} \sum_{i=0}^{N-1} w_{k,i} x_{2,i}^* x_{1,i} h_{1,i} + x_{2,k} \sum_{i=0}^{N-1} w_{k,i} x_{2,i}^* n_i \qquad (29)$$
$$= x_{2,k} \sum_{i=0}^{N-1} w_{k,i} h_{2,i} + x_{1,k} w_{k,k} h_{1,k} + x_{2,k} \sum_{\substack{i=0 \\ i \neq k}}^{N-1} w_{k,i} x_{2,i}^* x_{1,i} h_{1,i} +$$
$$x_{2,k} \sum_{i=0}^{N-1} w_{k,i} x_{2,i}^* n_i$$

In the expression (29), a first term represents a signal of the interfering cell C1 that is an original calculation target. A second term represents a signal of the measurement target cell on the same RS subcarrier #k. A third term represents correlation between the signal of the interfering cell C1 and the signal of the measurement target cell, and a fourth term represents noise. Among these terms, the third term and the fourth term can be disregarded since their values are close to 0 on the average. The RSRP measurement unit 16 tries to obtain only the replica of the interfering cell C1 (first term), but it obtains the mixture of the replica of the interfering cell C1 (first term) and a signal of the measurement target cell (second term). Accordingly, when the RSRP measurement unit 16 subtracts the replica of the signal of the interfering cell C1 from the received signal in the expression (19), part of the signal component of the measurement target cell is also subtracted. As a result, as expressed in the first term of the following expression (30), a power value may possibly be measured in the state of lacking part of its electric power that is to be included in the value.

$$z_k = y_k - r_{2,k} \qquad (30)$$
$$= (x_{1,k} h_{1,k} + x_{2,k} h_{2,k} + n_k) -$$
$$\left( x_{2,k} \sum_{i=0}^{N-1} w_{k,i} h_{2,i} + x_{1,k} w_{k,k} h_{1,k} + x_{2,k} \sum_{\substack{i=0 \\ i \neq k}}^{N-1} w_{k,i} x_{2,i}^* x_{1,i} h_{1,i} + x_{2,k} \sum_{i=0}^{N-1} w_{k,i} x_{2,i}^* n_i \right)$$
$$= x_{1,k}(1 - w_{k,k}) h_{1,k} + x_{2,k} \left( h_{2,k} - x_{2,k} \sum_{i=0}^{N-1} w_{k,i} h_{2,i} \right) +$$
$$\left( n_k - x_{2,k} \sum_{i=0}^{N-1} w_{k,i} x_{2,i}^* n_i - x_{2,k} \sum_{\substack{i=0 \\ i \neq k}}^{N-1} w_{k,i} x_{2,i}^* x_{1,i} h_{1,i} \right)$$

As mentioned above, in RSRP measurement using the CRS-IC, the value of RSRP becomes smaller than the ideal value in accordance with the diagonal components of the weighting matrix for use in channel estimation of the interfering cell C1. Accordingly, in the mobile station 10 according to the present embodiment, the weighting matrix adjustment unit 17 adjusts respective components of the weighting matrix used in the interfering cell channel estimation unit 12. Specifically, the weighting matrix adjustment unit 17 adjusts the respective components so that the electric power of the diagonal components becomes smaller than the electric power of non-diagonal components.

Here, assume a matrix in which the non-diagonal components remain unchanged while the electric power of the diagonal components is set to 0. In this case, a channel estimation matrix $W_{CRS-IC}$ is expressed in the form of the following expression (31):

$$W_{CRS-IC} = \begin{bmatrix} 0 & w_{0,1} & \cdots & w_{0,N-1} \\ w_{1,0} & 0 & \cdots & w_{1,N-1} \\ \vdots & \vdots & \ddots & \vdots \\ w_{N-1,0} & w_{N-1,1} & \cdots & 0 \end{bmatrix}. \qquad (31)$$

The channel estimation matrix $W_{CRS-IC}$ may further be expressed in the form of the following expression (32) by using the variable W (see expression (6)) and the variable $\Omega$ (see expression (24)).

$$W_{CRS-IC} = W - \Omega \qquad (32)$$

When the expression (32) is substituted in W in the expression (22), the following expression (33) is satisfied.

$$\tilde{h}_1 = \langle \tilde{h}_{1,ZF} \rangle_{n, x_1, x_2} \qquad (33)$$

$$= \left\langle \begin{array}{c} (I - X_1^H X_2 W_{CRS-IC} X_2^H X_1) h_1 + \\ X_1^H X_2 (I - W_{CRS-IC}) h_2 + X_1^H (I - X_2 W_{CRS-IC} X_2^H) n \end{array} \right\rangle_{n, x_1, x_2}$$

$$= h_1$$

In the expression (33), expression modification is performed as expressed in the following expression (34).

$$\langle X_1^H X_2 W_{CRS-IC} X_2^H X_1 \rangle_{x_1, x_2} = \langle X_1^H X_2 (W - \Omega) X_2^H X_1 \rangle_{x_1, x_2} \qquad (34)$$

$$= \langle X_1^H X_2 W X_2^H X_1 \rangle_{x_1 x_2} -$$

$$\langle X_1^H X_2 \Omega X_2^H X_1 \rangle_{x_1 x_2}$$

$$= \text{diag} W - \text{diag} \Omega$$

$$= \Omega - \Omega$$

$$= 0$$

The channel estimation value $h_1$ calculated as described above is converted into a power value as expressed in the following expression (35). As a result, a value $P_{CRS-IC}$, which is a measurement value of the electric power P, matches the ideal value $P_{ideal}$.

$$P_{CRS-IC} = \frac{1}{N} \tilde{h}_1^H \tilde{h}_1 \qquad (35)$$

$$= \frac{1}{N} h_1^H h_1$$

$$= P_{ideal}$$

The power value of the diagonal components is preferably set to 0. However, even when the power value is not completely 0 but is relatively approximate to 0 as compared with the power value of the non-diagonal components, the mobile station 10 can measure a precise RSRP close to the ideal value.

Figure 3:
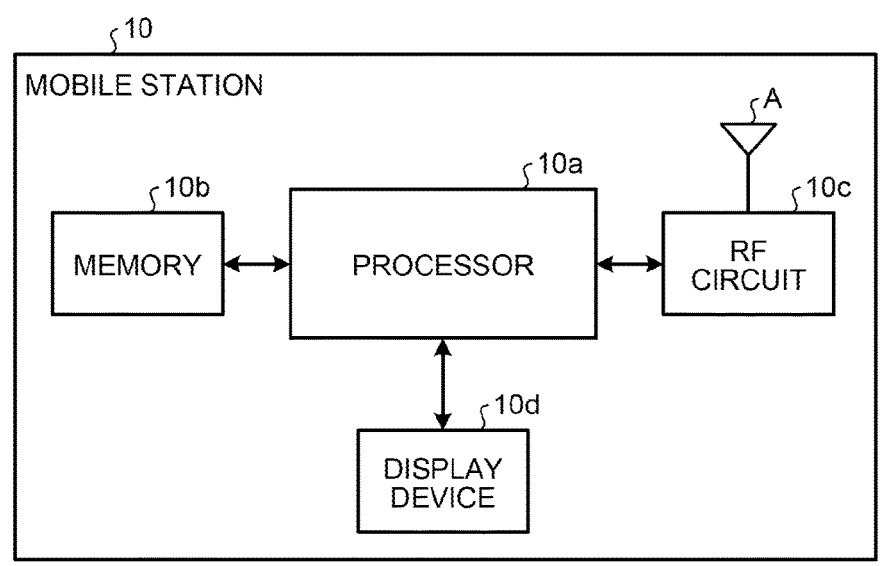
FIG. 3 is a block diagram illustrating a hardware configuration of the mobile station.

Next, the hardware configuration of the mobile station 10 will be described. FIG. 3 is a block diagram illustrating the hardware configuration of the mobile station 10. As illustrated in FIG. 3, the mobile station 10 has a processor 10a, a memory 10b, a radio frequency (RF) circuit 10c, and a display device 10d on the hardware level. The RF circuit 10c has an antenna A. For example, the processor 10a is a central processing unit (CPU). For example, the memory 10b is a random access memory (RAM) such as a synchronous dynamic random access memory (SDRAM), a read only memory (ROM), and a flash memory. For example, the display device 10d is a liquid crystal display (LCD) and an electro luminescence (EL) display. The correspondence relation between the functional configuration and the hardware configuration is as described below. That is, among the respective functional component members illustrated in FIG. 1, the pilot pattern generation and cancellation unit 11, the interfering cell channel estimation unit 12, the channel estimation weighting matrix calculation unit 13, the interfering cell replica generation unit 14, the received signal calculation unit 15, and the weighting matrix adjustment unit 17 may be implemented by, for example, an integrated circuit such as the processor 10a. The RSRP measurement unit 16 may be implemented by the RF circuit 10c.

As described in the foregoing, the mobile station 10 has the channel estimation weighting matrix calculation unit 13, the interfering cell replica generation unit 14, the weighting matrix adjustment unit 17, the interfering cell channel estimation unit 12, and the RSRP measurement unit 16. The channel estimation weighting matrix calculation unit 13 calculates a weighting matrix (for example, the matrix W in the expression (6)) for use in channel estimation of the interfering cell C1. The weighting matrix adjustment unit 17 adjusts values of the respective components so that out of the respective components of the weighting matrix calculated by the channel estimation weighting matrix calculation unit 13, diagonal components are smaller than components (non-diagonal components) other than the diagonal components. The interfering cell channel estimation unit 12 suppresses a noise component included in a value of the channel estimation by using the weighting matrix, whose values of the respective components were adjusted by the weighting matrix adjustment unit 17, so as to perform the channel estimation of the interfering cell C1. The RSRP measurement unit 16 cancels a signal of the interfering cell C1, which is generated by the interfering cell replica generation unit 14 based on the channel estimation result by the interfering cell channel estimation unit 12, from a received signal, and measures a reception quality of the received signal. In the mobile station 10, the weighting matrix adjustment unit 17 may adjust the values of the respective components so that the diagonal components are equal to 0. As a consequence, the mobile station 10 can improve the accuracy in measurement of the reception quality.

[b] Second Embodiment

Figure 4:
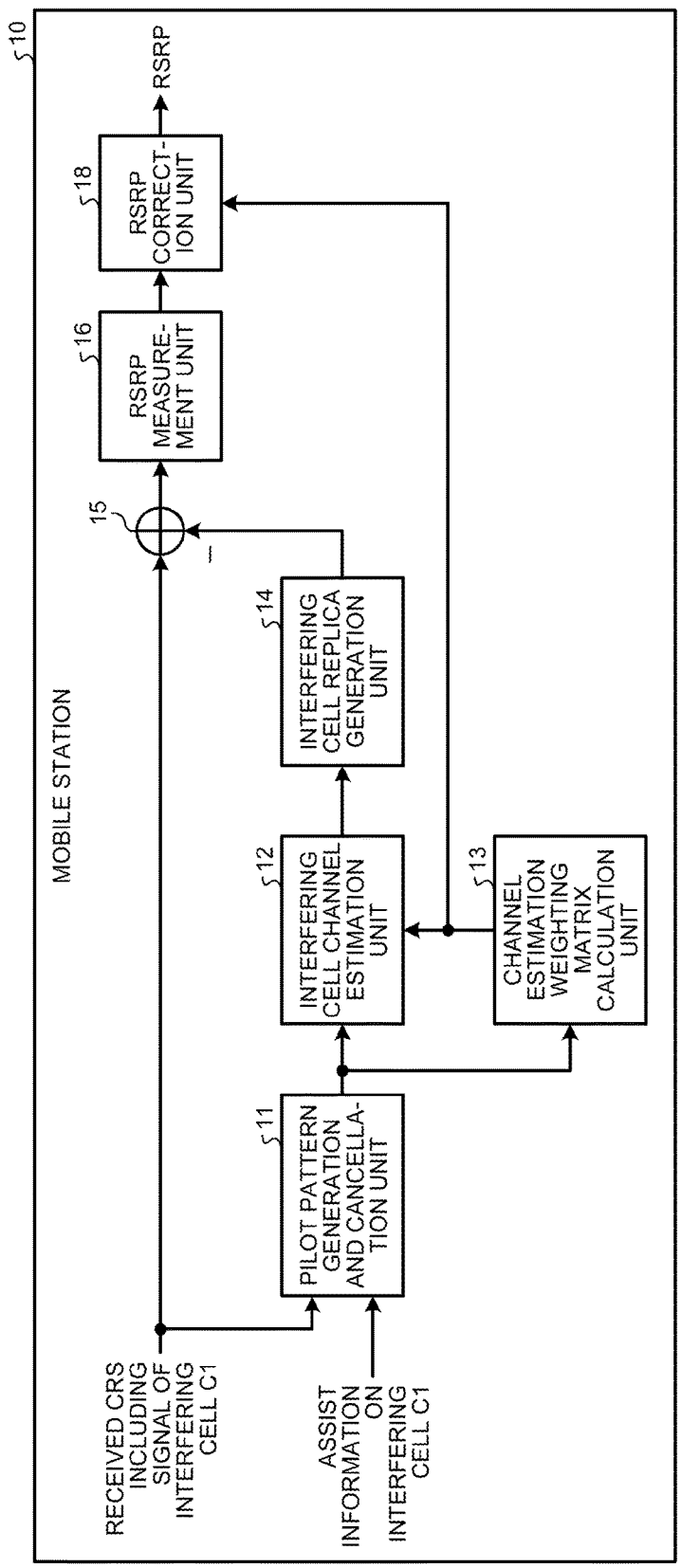
FIG. 4 is a block diagram illustrating the functional configuration of a mobile station according to a second embodiment.

Now, the second embodiment of the present invention will be described. FIG. 4 is a block diagram illustrating the functional configuration of a mobile station 10 according to the second embodiment. As illustrated in FIG. 4, the mobile station 10 according to the second embodiment has the same configuration as the mobile station 10 according to the first embodiment illustrated in FIG. 1 except for the point that an RSRP correction unit 18 is provided in place of the weighting matrix adjustment unit 17. Therefore, in the second embodiment, component members similar to those in the first embodiment are designated by similar reference numerals to omit the detailed description thereof.

While the first embodiment uses the method for approximating the channel estimation value of the interfering cell to the ideal value, the second embodiment uses a method for approximating the RSRP measurement value measured in a conventional manner to the ideal value. Specifically, in the first embodiment, the mobile station 10 employs the method in which the weighting matrix adjustment unit 17 adjusts a weighting matrix for use in channel estimation of the interfering cell C1. In the second embodiment, the mobile station 10 employs a method in which the value of RSRP is measured and then the RSRP correction unit 18 corrects the measured RSRP value. Hereinbelow, such an RSRP measuring process of the mobile station 10 according to the second embodiment will be described by focusing on a difference from the first embodiment.

The RSRP correction unit 18 of the mobile station 10 corrects the RSRP value, which is measured by the RSRP measurement unit 16 with use of CRS-IC, based on the following expressions (36) and (37):

$$RSRP_{ideal} \approx RSRP_{CRS-IC} = RSRP_{est} - \Delta RSRP, \quad (36)$$

$$\Delta RSRP = 10\log_{10}\left(\frac{1}{N}\sum_{i=0}^{N-1}|1-w_{i,i}|^2\right). \quad (37)$$

A description will now be given of a method for calculating the correction value expressed in the expression (37). First, the power value $P_{est}$ calculated with use of the CRS-IC is represented by the following expression (38):

$$P_{est} = \frac{1}{N}h_1^H(I-\Omega)^H(I-\Omega)h_1 \quad (38)$$

$$= \frac{1}{N}\sum_{i=0}^{N-1}|(1-w_{i,i})h_{1,i}|^2.$$

Here, if it is assumed that variations in channel in a frequency direction are sufficiently small, the following expression (39) is satisfied.

$$h_{1,0}=h_{1,1}=\ldots=h_{1,N-1}=h_1 \quad (39)$$

Furthermore, because of the expression (39), the following expression (40) is satisfied.

$$P_{est} \approx \frac{1}{N}\sum_{i=0}^{N-1}|(1-w_{i,i})h_1|^2 \quad (40)$$

$$\frac{1}{N}|h_1|^2\sum_{i=0}^{N-1}|1-w_{i,i}|^2$$

When the RSRP is calculated by using the expression (40), the following expression (41) is satisfied. A second term of the expression (41) represents a deviation generated due to the use of the CRS-IC.

$$RSRP_{est} = 10\log_{10}P_{est} \quad (41)$$

$$= 10\log_{10}\left(\frac{1}{N}|h_1|^2\sum_{i=0}^{N-1}|1-w_{i,i}|^2\right)$$

$$= 10\log_{10}|h_1|^2 + 10\log_{10}\left(\frac{1}{N}\sum_{i=0}^{N-1}|1-w_{i,i}|^2\right)$$

Here, an ideal power value $P_{ideal}$ and a value $RSRP_{ideal}$ obtained by converting the $P_{ideal}$ value into a dB value are expressed by the following expressions (42) and (43), respectively:

$$P_{ideal} = \frac{1}{N}h_1^H h_1 \quad (42)$$

$$= \frac{1}{N}\sum_{i=0}^{N-1}|h_{1,i}|^2$$

$$\approx |h_1|^2,$$

$$RSRP_{ideal} = 10\log_{10}P_{ideal} \quad (43)$$

$$= 10\log_{10}|h_1|^2.$$

Therefore, the following expression (44) is satisfied.

$$RSRP_{est} = 10\log_{10}P_{est} = RSRP_{ideal} + \Delta RSRP \quad (44)$$

$$\Delta RSRP = 10\log_{10}\left(\frac{1}{N}\sum_{i=0}^{N-1}|(1-w_{i,i})|^2\right)$$

According to the expression (44), the value of $RSRP_{est}$ measured with use of the CRS-IC is larger by $\Delta RSRP$ than the value of $RSRP_{ideal}$ which is an ideal value of $RSRP_{est}$.

Generally, the following expression (45) is satisfied, so that the value of $\Delta RSRP$ is a negative value. As a result, the value of $RSRP_{est}$ becomes smaller than the value of $RSRP_{ideal}$.

$$\frac{1}{N}\sum_{i=0}^{N-1}|1-w_{i,i}|^2 < 1 \quad (45)$$

As described in the foregoing, the mobile station 10 has the channel estimation weighting matrix calculation unit 13, the interfering cell replica generation unit 14, the interfering cell channel estimation unit 12, the RSRP measurement unit 16, and the RSRP correction unit 18. The channel estimation weighting matrix calculation unit 13 calculates a weighting matrix (for example, the matrix W in the expression (6)) for use in channel estimation of the interfering cell C1. The interfering cell channel estimation unit 12 suppresses a noise component included in a value of the channel estimation by using the weighting matrix calculated by the channel estimation weighting matrix calculation unit 13 so as to perform the channel estimation of the interfering cell C1. The RSRP measurement unit 16 cancels the signal of the interfering cell C1, which is generated by the interfering cell replica generation unit 14 based on the channel estimation result by the interfering cell channel estimation unit 12, from the received signal, and measures a reception quality of the received signal. The RSRP correction unit 18 corrects the reception quality measured by the RSRP measurement unit 16 by using the correction value calculated with use of the weighting matrix. As a result, the mobile station 10 can improve the accuracy in measurement of the reception quality.

Figures 5A, 5B:
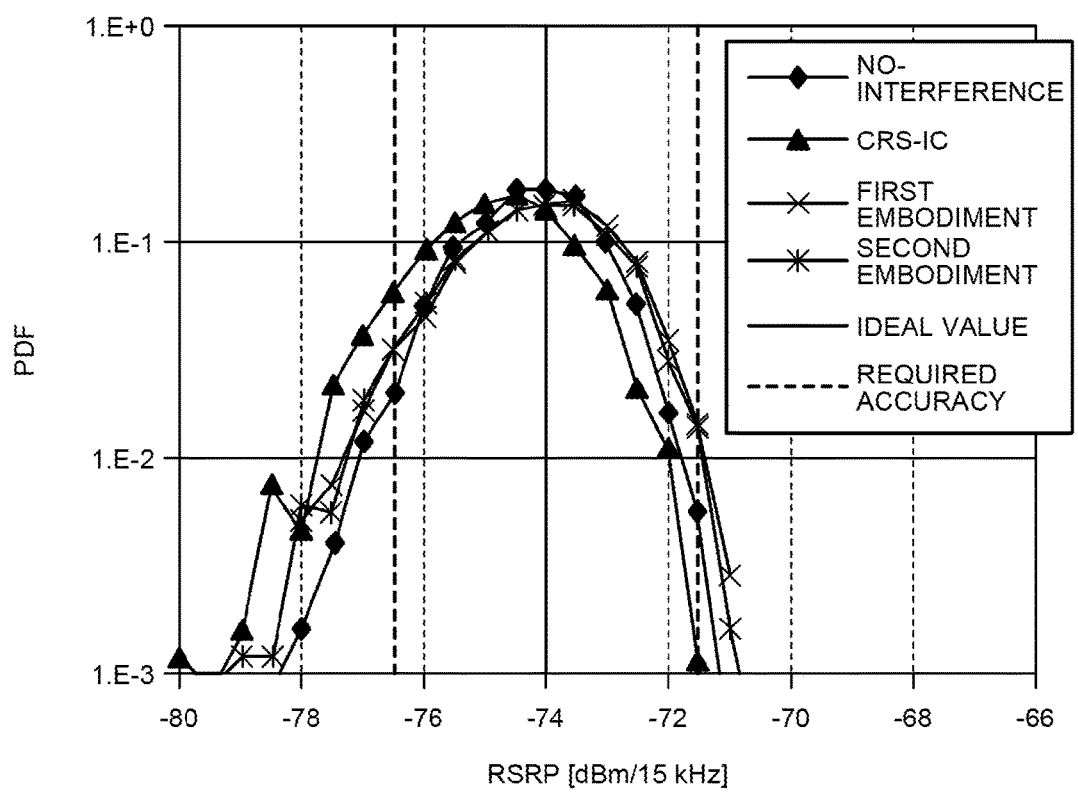
FIG. 5A illustrates a probability distribution of RSRP measurement values when the mobile station is unmoved.
FIG. 5B illustrates a probability to be within required accuracy range when X=2.5 [dB]

Next, with reference to FIGS. 5A and 5B, the effects of the first and second embodiments will be described. FIG. 5A illustrates a probability distribution of RSRP measurement values when the mobile station 10 is static. In FIG. 5A, an x-axis represents RSRP values while a y-axis represents values of probability density function (PDF). A curve of "no-interference" represents a distribution of the RSRP measurement values when the signal of the interfering cell is completely canceled by CRS-IC. A curve of "CRS-IC" represents a distribution of RSRP measurement values measured by using conventional CRS-IC. Curves of "first embodiment" and "second embodiment" are distributions of RSRP measurement values measured by using the present invention. A line of "ideal value" represents an RSRP value of a measurement target cell, which is a value to be obtained by measurement. A range of "required accuracy" represents a range of ideal value±XdB. It is specified that 90% or more of the measurement values are included within this range by the 3GPP standard. In FIG. 5A, X=2.5 [dB]. As illustrated in FIG. 5A, the PDF plots distribution curves closer to the non-interference curve than the CRS-IC curve in both the embodiments. More specifically, the RSRP measurement values in the first and second embodiments are less deviated from the ideal value as compared with the RSRP measurement value obtained by using CRS-IC. Accordingly, the RSRP measurement values in the first and second embodiments may have a high probability of falling within the required accuracy range specified by the 3GPP standard. FIG. 5B illustrates a probability to be within a required accuracy range when X=2.5 [dB]. As illustrated in FIG. 5B, the probability to be within a required accuracy range in the first and second embodiment are 94.2% and 94.4%, respectively, which are higher than the probability in the case of CRS-IC (89.5%). According to the 3GPP regulation, the probability of RSRP values to be within a required accuracy range is 90% or more in AWGN propagation environment. Both the embodiments satisfy this probability requirement.

Although the case of one interfering cell is described in the first and second embodiments, the RSRP measurement technologies according to the respective embodiments are also applicable to the case where a plurality of interfering cells are present in the vicinity of the mobile station 10. Hereinafter, with reference to FIGS. 6A, 6B, 7A, and 7B, a mobile station 10 according to first and second modifications will be described as a mobile station which can cope with the case of two interfering cells.

First Modification

Figure 6A:
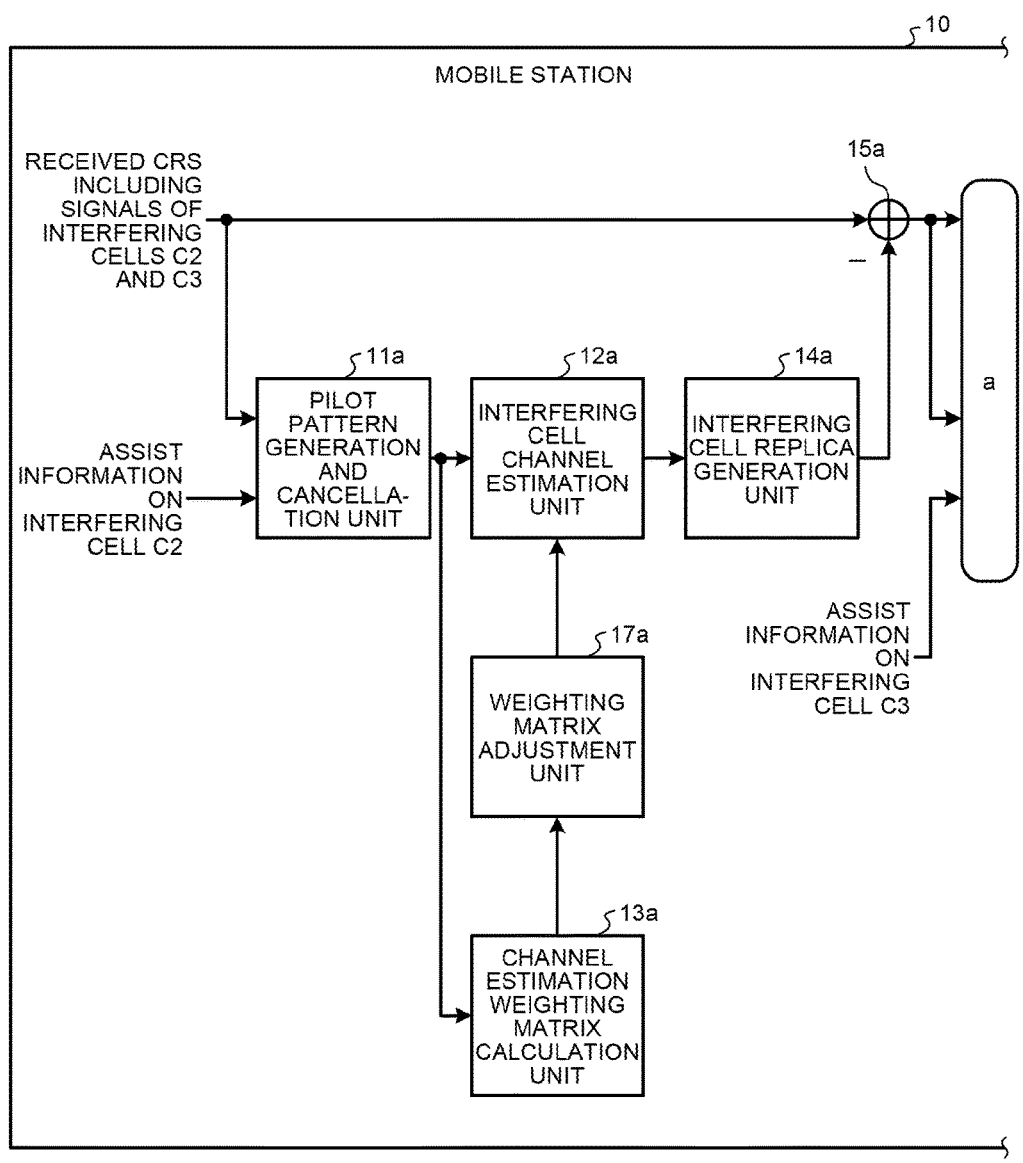
FIGS. 6A and 6B is a block diagram illustrating the functional configuration of a mobile station according to a first modification of the first embodiment.
Figure 6B:
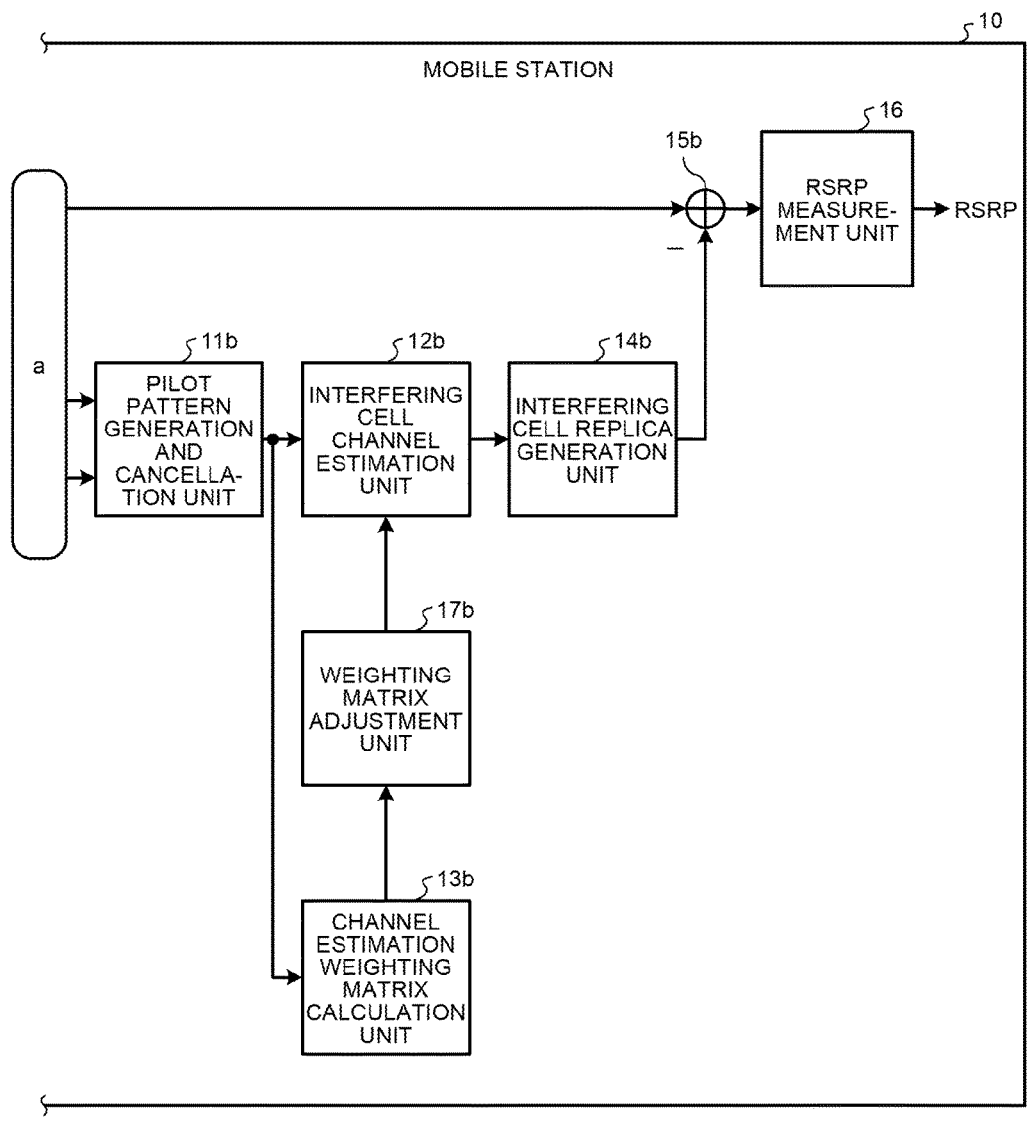

FIGS. 6A and 6B is a block diagram illustrating the functional configuration of a mobile station 10 according to the first modification of the first embodiment. As illustrated in FIGS. 6A and 6B, the mobile station 10 according to the first modification has two systems each including the function component members, from the pilot pattern generation and cancellation unit 11 to the received signal calculation unit 15, and the weighting matrix adjustment unit 17 described in the first embodiment. Since the functions of the respective function component members are similar to those of the first embodiment, the detailed description thereof is omitted. The mobile station 10 according to the first modification has a weighting matrix adjustment unit 17a that cancels a signal of an interfering cell C2 in a preceding stage, and a weighting matrix adjustment unit 17b that cancels a signal of an interfering cell C3 in a subsequent stage. Thus, the mobile station 10 can adjust the respective components of a channel estimation weighting matrix for each of a plurality of cancellation target cells independently of each other. Accordingly, when a plurality of interfering cells are present, the RSRP values can precisely be measured.

As described in the foregoing, when a plurality of interfering cells are present, the weighting matrix adjustment units (17a, 17b) in the mobile station 10 may adjust the values of the respective components for each of the plurality of interfering cells C2 and C3 independently of each other. An interfering cell channel estimation units 12a and 12b may perform channel estimation by using the weighting matrix (for example, the matrix $W_{CRS\text{-}IC}$ in the expression (31)) for each of the plurality of interfering cells C2 and C3 independently of each other. Furthermore, the RSRP measurement unit 16 may sequentially cancels the signals of the plurality of interfering cells C2 and C3 from the received signal based on the results of the channel estimation, and may measure the reception quality of the measurement target cell. As a consequence, even in the case where a plurality of interfering cells are present in the vicinity of the measurement target cell, the reception quality of the mobile station 10 can precisely be measured.

Second Modification

Figure 7A:
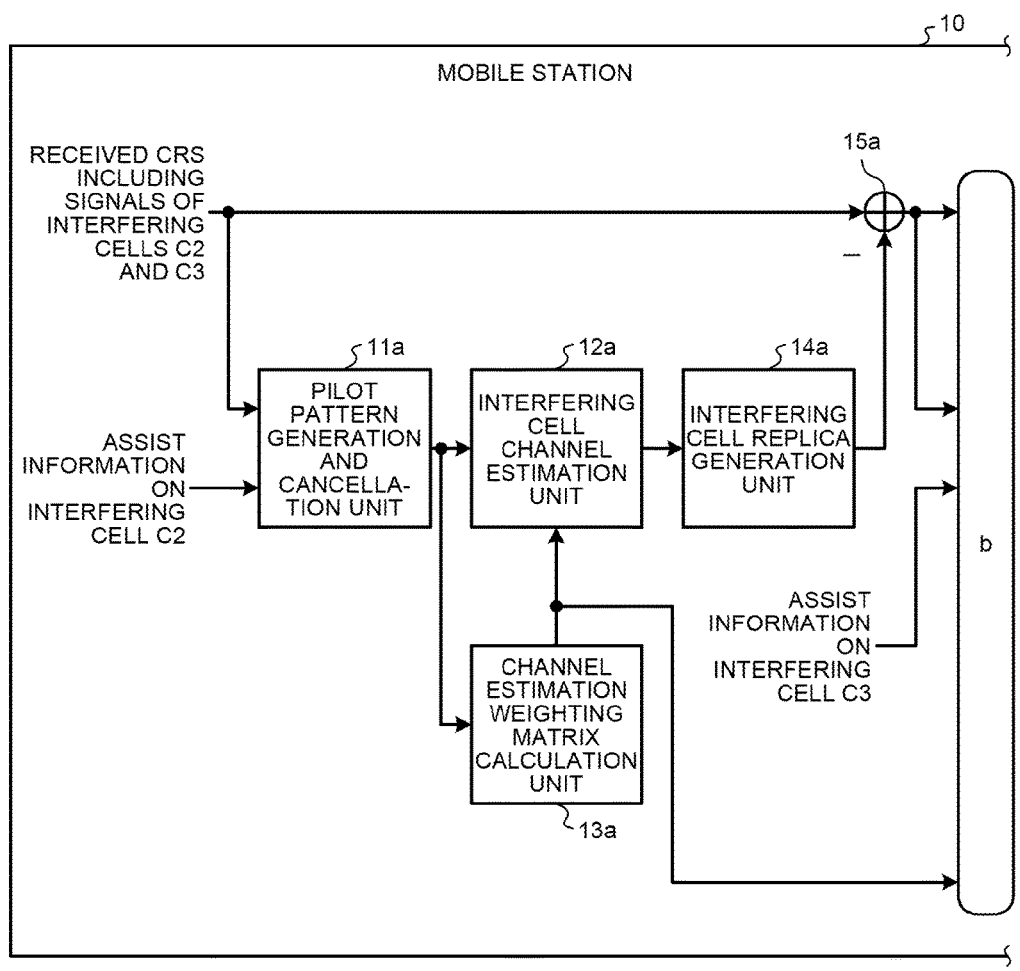
FIGS. 7A and 7B is a block diagram illustrating the functional configuration of a mobile station according to a second modification of the second embodiment.
Figure 7B:
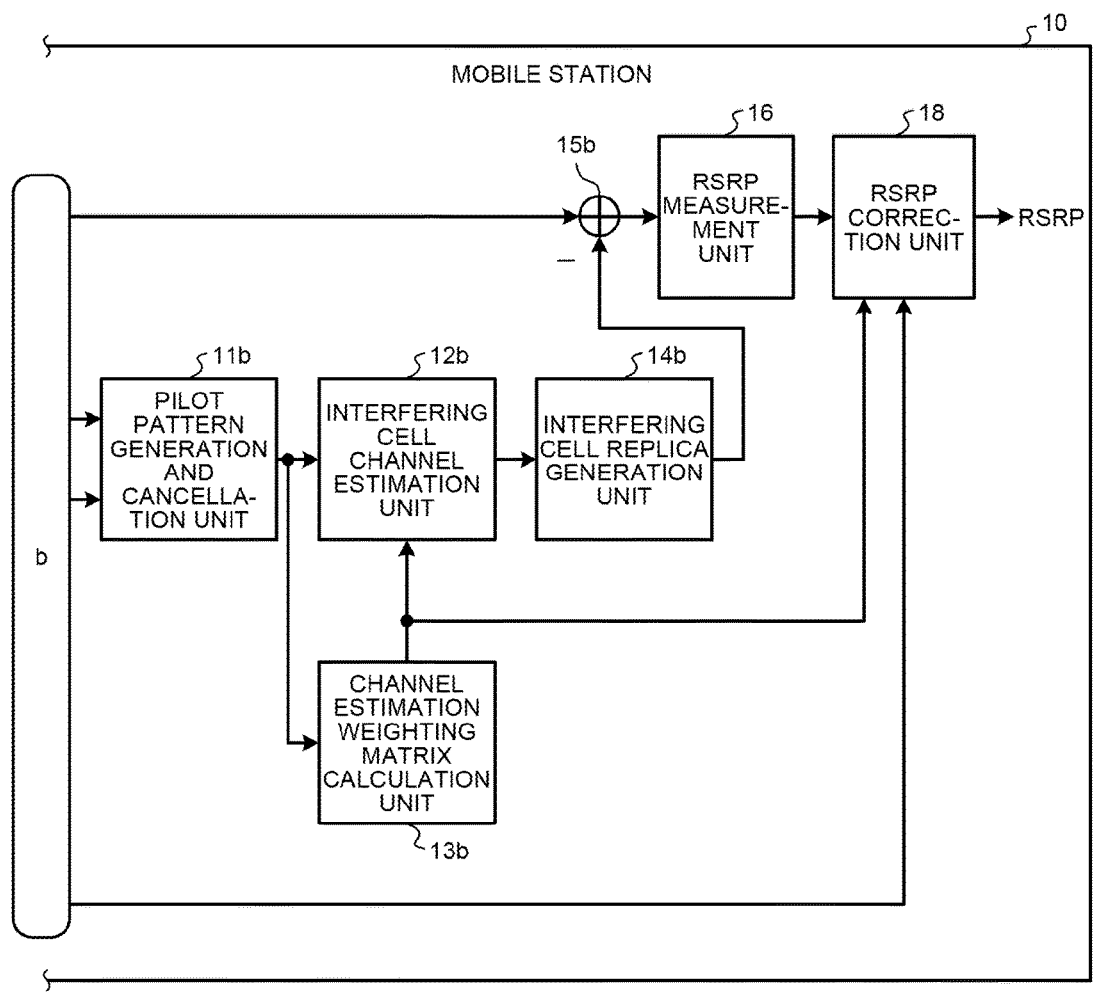
Figure 8:
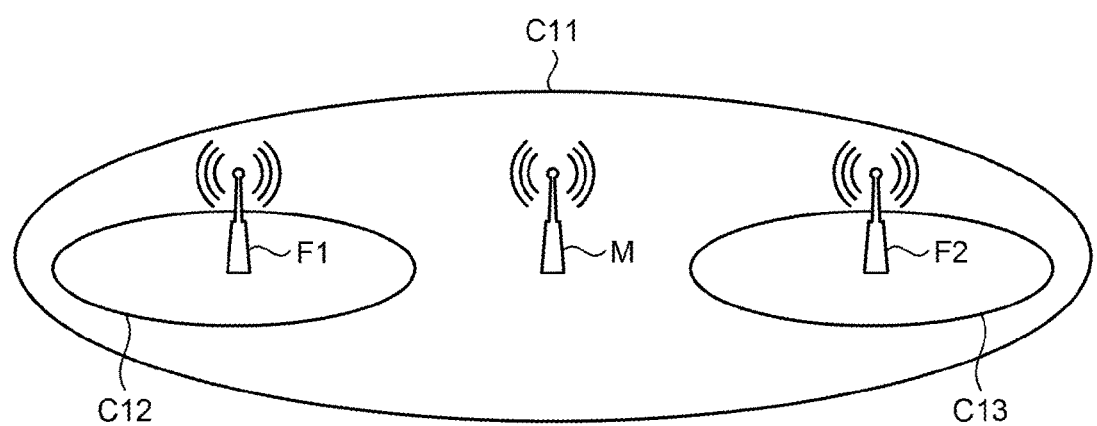
FIG. 8 illustrates a cell configuration of the HetNet.

FIGS. 7A and 7B is a block diagram illustrating the functional configuration of a mobile station 10 according to the second modification of the second embodiment. As illustrated in FIGS. 7A and 7B, the mobile station 10 according to the second modification has the same configuration as the mobile station 10 according to the first modification except for the point that an RSRP correction unit 180 is provided in place of the weighting matrix adjustment units 17a and 17b. Therefore, in the second modification, component members similar to those in the first modification are designated by similar reference numerals to omit the detailed description thereof. In the second modification as in the first modification, the mobile station 10 first cancels the signal of the interfering cell C2 and then cancels the signal of the interfering cell C3.

However, in the second modification, the value of ΔRSRP (correction value) in the following expression (46) is different from that in the second embodiment (see expression (37)). Accordingly, a calculating method thereof will be described below.

$$RSRP_{ideal} \approx RSRP_{CRS\text{-}IC} = RSRP_{est} - \Delta RSRP \quad (46)$$

First, as a premise of correction value calculation, the CRS and the channel of a measurement target cell on the RS subcarrier #k are set to $x_{1,k}$ and $h_{1,k}$, respectively. The CRS and the channel of the interfering cell C2 are set to $x_{2,k}$ and $h_{1,k}$, respectively, and the CRS and the channel of the interfering cell C3 are set to $x_{3,k}$ and $h_{3,k}$, respectively. Noise is set to $n_k$. Based on this premise, a received signal $y_k$ is expressed in the form of the following expression (47):

$$y_k = x_{1,k} h_{1,k} + x_{2,k} h_{2,k} + x_{3,k} h_{3,k} + n_k \quad (47).$$

When respective matrices and vectors which collectively represent N subcarriers are expressed in the form of the following expression (48), a received signal vector y is expressed in the form of the following expression (49).

$$y = \begin{bmatrix} y_0 \\ y_1 \\ \vdots \\ y_{N-1} \end{bmatrix}, \quad (48)$$

$$x_1 = \begin{bmatrix} x_{1,0} & 0 & \cdots & 0 \\ 0 & x_{1,1} & \cdots & 0 \\ \vdots & \vdots & \ddots & \vdots \\ 0 & 0 & \cdots & x_{1,N-1} \end{bmatrix},$$

$$h_1 = \begin{bmatrix} h_{1,0} \\ h_{1,1} \\ \vdots \\ h_{1,N-1} \end{bmatrix},$$

$$x_2 = \begin{bmatrix} x_{2,0} & 0 & \cdots & 0 \\ 0 & x_{2,1} & \cdots & 0 \\ \vdots & \vdots & \ddots & \vdots \\ 0 & 0 & \cdots & x_{2,N-1} \end{bmatrix},$$

-continued $$h_2 = \begin{bmatrix} h_{2,0} \\ h_{2,1} \\ \vdots \\ h_{2,N-1} \end{bmatrix},$$

$$x_3 = \begin{bmatrix} x_{3,0} & 0 & \cdots & 0 \\ 0 & x_{3,1} & \cdots & 0 \\ \vdots & \vdots & \ddots & \vdots \\ 0 & 0 & \cdots & x_{3,N-1} \end{bmatrix},$$

$$h_3 = \begin{bmatrix} h_{3,0} \\ h_{3,1} \\ \vdots \\ h_{3,N-1} \end{bmatrix},$$

$$n = \begin{bmatrix} n_0 \\ n_1 \\ \vdots \\ n_{N-1} \end{bmatrix}$$

$$y = X_1 h_1 + X_2 h_2 + X_3 h_3 + n \tag{49}$$

The RSRP measurement unit 16 of the mobile station 10 ranks the plurality of interfering cells C2 and C3 for cancellation, and sequentially cancels the signals from the interfering cells C2 and C3 based on the rank. In the present embodiment, the RSRP measurement unit 16 first cancels the signal of the interfering cell C2 and then cancels the signal of the interfering cell C3. The RSRP measurement unit 16 then measures RSRP of the measurement target cell.

In order to cancel the CRS pattern of the interfering cell C2 and to calculate a channel estimation value, a pilot pattern generation and cancellation unit 11*a* multiplies a received signal vector by the Hermitian transpose matrix of a CRS matrix of the interfering cell C2 (Zero-Forcing) as expressed in the following expression (50):

$$\tilde{h}_{2,ZF} = x_2^H y \tag{50}$$
$$= x_2^H (x_1 h_1 + x_2 h_2 + x_3 h_3 + n)$$
$$= h_2 + x_2^H (x_1 h_1 + x_3 h_3 + n).$$

The interfering cell channel estimation unit 12*a* then performs averaging among the subcarriers as expressed in the following expression (51) so as to suppress a noise component included in the channel estimation value.

$$\tilde{h}_2 = W_2 \tilde{h}_{2,ZF} \tag{51}$$
$$= W_2 h_2 + W_2 X_2^H (X_1 h_1 + X_3 h_3 + n)$$

In the expression (51), $W_2$ represents a weighting matrix calculated in order to estimate the channel of the interfering cell C2. The matrix $W_2$ is expressed by the following expression (52):

$$W_2 = \begin{bmatrix} W_{0,0}^{(2)} & W_{0,1}^{(2)} & \cdots & W_{0,N-1}^{(2)} \\ W_{1,0}^{(2)} & W_{1,1}^{(2)} & \cdots & W_{1,N-1}^{(2)} \\ \vdots & \vdots & \ddots & \vdots \\ W_{N-1,0}^{(2)} & W_{N-1,1}^{(2)} & \cdots & W_{N-1,N-1}^{(2)} \end{bmatrix}. \tag{52}$$

Next, an interfering cell replica generation unit 14*a* multiplies the CRS pattern of the interfering cell C2 by a channel estimation value $h_2$ as expressed by the following expression (53) to generate a replica $r_2$ of the signal of the interfering cell C2.

$$r_2 = X_2 \tilde{h}_2 \tag{53}$$
$$= X_2 (W_2 h_2 + W_2 X_2^H (X_1 h_1 + X_3 h_3 + n))$$
$$= X_2 W_2 h_2 + X_2 W_2 X_2^H (X_1 h_1 + X_3 h_3 + n)$$

As expressed in the following expression (54), a received signal calculation unit 15*a* subtracts the replica $r_2$ from the original received signal y to obtain a received signal $z_2$ which does not include the signal of the interfering cell C2.

$$z_2 = y - r_2 \tag{54}$$
$$= \{X_2 h_2 + (X_1 h_1 + X_3 h_3 + n)\} -$$
$$\{X_2 W_2 h_2 + X_2 W_2 X_2^H (X_1 h_1 + X_3 h_3 + n)\}$$
$$= (I - X_2 W_2 X_2^H)(X_1 h_1 + X_3 h_3 + n) + X_2 (I - W_2) h_2$$

Next, a pilot pattern generation and cancellation unit 11*b* multiplies the received signal vector, in which the signal of the interfering cell C2 was canceled, by the Hermitian transpose matrix of a CRS matrix of the interfering cell C3 (Zero-Forcing) as expressed in the following expression (55). As a consequence, the CRS pattern of the interfering cell C3 is canceled, and a channel estimation value $h_3$ is calculated.

$$\tilde{h}_{3,ZF} = X_3^H z_2 \tag{55}$$
$$= X_3^H \{(I - X_2 W_2 X_2^H)(X_1 h_1 + X_3 h_3 + n) + X_2 (I - W_2) h_2\}$$

The interfering cell channel estimation unit 12*b* then performs averaging among the subcarriers as expressed in the following expression (56) so as to suppress a noise component included in the channel estimation value.

$$\tilde{h}_3 = W_3 \tilde{h}_{3,ZF} \tag{56}$$
$$= W_3 X_3^H \{(I - X_2 W_2 X_2^H)(X_1 h_1 + X_3 h_3 + n) + X_2 (I - W_2) h_2\}$$

In the expression (56), $W_3$ represents a weighting matrix calculated in order to estimate the channel of the interfering cell C3. The matrix $W_3$ is expressed by the following expression (57):

$$W_3 = \begin{bmatrix} W_{0,0}^{(3)} & W_{0,1}^{(3)} & \cdots & W_{0,N-1}^{(3)} \\ W_{1,0}^{(3)} & W_{1,1}^{(3)} & \cdots & W_{1,N-1}^{(3)} \\ \vdots & \vdots & \ddots & \vdots \\ W_{N-1,0}^{(3)} & W_{N-1,1}^{(3)} & \cdots & W_{N-1,N-1}^{(3)} \end{bmatrix}. \tag{57}$$

Next, the interfering cell replica generation unit 14*a* multiplies the CRS pattern of the interfering cell C3 by the channel estimation value $h_3$ as expressed by the following expression (58) to generate a replica $r_3$ of the signal of the interfering cell C3.

$$r_3 = X_3 \tilde{h}_3 \qquad (58)$$
$$= X_3 W_3 X_3^H \{(I - X_2 W_2 X_2^H)(X_1 h_1 + X_3 h_3 + n) + X_2(I - W_2)h_2\}$$

As expressed in the following expression (59), a received signal calculation unit 15b subtracts the replica $r_3$ from the received signal $z_2$ in which the signal of the interfering cell C2 was canceled. As a result, a received signal $z_3$ which does not include the signals of the interfering cells C2 and C3 is obtained.

$$z_3 = z_2 - r_3 \qquad (59)$$
$$= \{(I - X_2 W_2 X_2^H)(X_1 h_1 + X_3 h_3 + n) + X_2(I - W_2)h_2\} -$$
$$X_3 W_3 X_3^H \{(I - X_2 W_2 X_2^H)(X_1 h_1 + X_3 h_3 + n) + X_2(I - W_2)h_2\}$$
$$= (I - X_3 W_3 X_3^H)\{(I - X_2 W_2 X_2^H)(X_1 h_1 + X_3 h_3 + n) + X_2(I - W_2)h_2\}$$

Next, the RSRP measurement unit 16 multiplies the received signal vector, in which the signals of the interfering cells C2 and C3 were canceled, by the Hermitian transpose matrix of the CRS matrix of the measurement target cell (Zero-Forcing) as expressed in the following expression (60). As a consequence, the CRS patterns of the interfering cells C2 and C3 are canceled, and a channel estimation value $h_1$ is calculated.

$$\tilde{h}_{1,ZF} = X_1^H z_3 \qquad (60)$$
$$= X_1^H (I - X_3 W_3 X_3^H)\{(I - X_2 W_2 X_2^H)(X_1 h_1 + X_3 h_3 + n) + X_2(I - W_2)h_2\}$$
$$= X_1^H (I - X_3 W_3 X_3^H)(I - X_2 W_2 X_2^H)X_1 h_1 +$$
$$X_1^H (I - X_3 W_3 X_3^H)(I - X_2 W_2 X_2^H)(X_3 h_3 + n) +$$
$$X_1^H (I - X_3 W_3 X_3^H)X_2(I - W_2)h_2$$

In the expression (60), it is assumed that transmission power per CRS subcarrier is equal to "1" as the following expression (61).

$$X_1^H X_1 = I \qquad (61)$$

Next, the RSRP measurement unit 16 averages the calculation results obtained by the expression (60) over a plurality of OFDM symbols by using the following expression (62). As a result, the noise component included in the channel estimation value is suppressed.

$$\tilde{h}_1 = \langle \tilde{h}_{1,ZF} \rangle_{n,X_1,X_2} \qquad (62)$$
$$= \left\langle \begin{array}{l} X_1^H (I - X_3 W_3 X_3^H)(I - X_2 W_2 X_2^H)X_1 h_1 + \\ X_1^H (I - X_3 W_3 X_3^H)(I - X_2 W_2 X_2^H)(X_3 h_3 + n) + \\ X_1^H (I - X_3 W_3 X_3^H)X_2(I - W_2)h_2 \end{array} \right\rangle_{n,X_1,X_2,X_3}$$
$$= \langle X_1^H (I - X_3 W_3 X_3^H)(I - X_2 W_2 X_2^H)X_1 h_1 \rangle_{X_1,X_2,X_3} +$$

-continued
$$\langle X_1^H (I - X_3 W_3 X_3^H)(I - X_2 X_2 X_2^H)(X_3 h_3 + n) \rangle_{n,X_1,X_2,X_3} +$$
$$\langle X_1^H (I - X_3 W_3 X_3^H)X_2(I - W_2)h_2 \rangle_{X_1,X_2,X_3}$$
$$= \langle X_1^H (I - X_3 W_3 X_3^H)(I - X_2 W_2 X_2^H)X_1 \rangle_{X_1,X_2,X_3} h_1 +$$
$$\langle X_1^H \rangle_{X_1} \langle (I - X_3 W_3 X_3^H)(I - X_2 W_2 X_2^H)(X_3 h_3 + n) \rangle_{n,X_2,X_3} +$$
$$\langle X_1^H \rangle_{X_1} \langle I - X_3 W_3 X_3^H \rangle_{X_3} \langle X_2 \rangle_{X_2} (I - W_2)h_2$$
$$= \langle X_1^H (I - X_3 W_3 X_3^H)(I - X_2 W_2 X_2^H)X_1 \rangle_{X_1,X_2,X_3} h_1$$
$$= (I - \Omega_3)(I - \Omega_2)h_1$$

Furthermore, the RSRP measurement unit 16 calculates $\Omega_2$ and $\Omega_3$ as defined in (63). In the following expression, diagW represents a matrix in which values other than diagonal component values of the matrix W are set to 0.

$$\langle X_1^H (I - X_3 W_3 X_3^H)(I - X_2 W_2 X_2^H)X_1 \rangle_{X_1,X_2,X_3} = \qquad (63)$$
$$\text{diag}(\langle (I - X_3 W_3 X_3^H)(I - X_2 W_2 X_2^H) \rangle_{X_2,X_3}) =$$
$$\text{diag}(\langle (I - X_3 W_3 X_3^H) \rangle_{X_3} \langle I - X_2 W_2 X_2^H \rangle_{X_2}) =$$
$$\text{diag}((I - \langle X_3 W_3 X_3^H \rangle_{X_3})(I - \langle X_2 W_2 X_2^H \rangle_{X_2})) =$$
$$\text{diag}((I - \text{diag}W_3)(I - \text{diag}W_2)) =$$
$$(I - \text{diag}W_3)(I - \text{diag}W_2) = (I - \Omega_3)(I - \Omega_2)$$

The RSRP measurement unit 16 calculates a power value from expressions (62) by using the following expression (64):

$$P_{est} = \frac{1}{N} \tilde{h}_1^H \tilde{h}_1 \qquad (64)$$
$$= \frac{1}{N} h_1^H (I - \Omega_2)^H (I - \Omega_3)^H (I - \Omega_3)(I - \Omega_2)h_1.$$

As described above, since RSRP represents electric power in the units of dB, $\text{RSRP}_{est}$ which represents the value of RSRP measured by using the CRS-IC is expressed by the following expression (65):

$$\text{RSRP}_{est} = 10 \log_{10} P_{est} \qquad (65).$$

As expressed in the expression (64), when the power value obtained by cancelling the signals of the plurality of interfering cells C2 and C3 is compared with an ideal value, it can be found that the measurement value calculated by the RSRP measurement unit 16 of the mobile station 10 is smaller by $(I-\Omega_2)^H (I-\Omega_3)^H (I-\Omega_3)(I-\Omega_2)$. In the expression (64), $\Omega_2$ and $\Omega_3$ represent diagonal components of the weighting matrices for use in channel estimation of the interfering cells C2 and C3, respectively.

Therefore, the RSRP correction unit 18 corrects the measurement value by the RSRP measurement unit 16 in the following procedures. As a premise, the power value $P_{est}$ calculated with use of CRS-IC is expressed by the following expression (66):

$$P_{est} = \frac{1}{N} h_1^H (I - \Omega_2)^H (I - \Omega_3)^H (I - \Omega_3)(I - \Omega_2)h_1 \qquad (66)$$

$$= \frac{1}{N}\sum_{i=0}^{N-1}|(1-w_{i,i}^{(3)})(1-w_{i,i}^{(2)})h_{1,i}|^2.$$

Here, if it is assumed that variations in channel in the frequency direction are sufficiently small, the following expression (67) is satisfied.

$$h_{1,0} = h_{1,1} = \ldots = h_{1,N-1} = h_1 \quad (67)$$

Furthermore, because of the expression (67), the following expression (68) is satisfied.

$$P_{est} \approx \frac{1}{N}\sum_{i=0}^{N-1}|(1-w_{i,i}^{(3)})(1-w_{i,i}^{(2)})h_1|^2 \quad (68)$$

$$= \frac{1}{N}|h_1|^2\sum_{i=0}^{N-1}|(1-w_{i,i}^{(3)})(1-w_{i,i}^{(2)})|^2$$

When the value of RSRP is calculated by using the expression (68), the following expression (69) is satisfied. A second term of the expression (69) represents a deviation generated due to the use of CRS-IC.

$$RSRP_{est} = 10\log_{10}P_{est} \quad (69)$$

$$= 10\log_{10}\left(\frac{1}{N}|h_1|^2\sum_{i=0}^{N-1}|(1-w_{i,i}^{(3)})(1-w_{i,i}^{(2)})|^2\right)$$

$$= 10\log_{10}|h_1|^2 + 10\log_{10}\left(\frac{1}{N}\sum_{i=0}^{N-1}|(1-w_{i,i}^{(3)})(1-w_{i,i}^{(2)})|^2\right)$$

More specifically, the correction value by the RSRP correction unit 18 can be expressed as ΔRSRP in the following expression (70). The correction value ΔRSRP is determined by the diagonal components of the weighting matrices for use in channel estimation of the respective interfering cells C2 and C3, and is not influenced by the cell rank for signal cancellation.

$$RSRP_{est} = 10\log_{10}P_{est} \quad (70)$$
$$= RSRP_{ideal} + \Delta RSRP$$

$$\Delta RSRP = 10\log_{10}\left(\frac{1}{N}\sum_{i=0}^{N-1}|(1-w_{i,i}^{(3)})(1-w_{i,i}^{(2)})|^2\right)$$

As described in the foregoing, even in the case where a plurality of interfering cells are present in the vicinity of the measurement target cell, the reception quality of the mobile station 10 can precisely be measured.

In the first and second modifications, the case where two interfering cells are present as a cancellation target has been described. However, three or more interfering cells may be present. In the respective embodiments and modifications, the mobile station 10 has been described as a smartphone. However, the present invention is applicable not only to smartphones, but also to various communication apparatuses capable of measuring the reception quality, such as cellular phones and personal digital assistants (PDAs). The reception quality may be expressed not only as the RSRP value but also as, for example, a received signal strength indication (RSSI) value that represents radio wave intensity, a signal-to-interference and noise ratio (SINR) value, and a reference signal received quality (RSRQ) value. The reception quality may also be expressed as channel state information (CSI) such as a channel quality indicator (CQI), a precoding matrix indicator (PMI), a rank indicator (RI), and a layer indicator (LI).

The respective component members of the mobile station 10 illustrated in FIG. 1 may have physical constitutions different from those illustrated in the drawings. More specifically, the concrete distribution and integration of each apparatus is not limited by illustrations, but the whole or part of each apparatus may functionally or physically be distributed and integrated in arbitrary units depending on various kinds of loads, use conditions, and the like. For example, in the mobile station 10, the received signal calculation unit 15 and the RSRP measurement unit 16, or the interfering cell channel estimation unit 12 and the interfering cell replica generation unit 14 may be integrated as a respective single component member. In the first embodiment, the mobile station 10 may be configured such that the weighting matrix adjustment unit 17 is incorporated in the channel estimation weighting matrix calculation unit 13 in the preceding stage or the interfering cell channel estimation unit 12 in the subsequent stage. Similarly, in the second embodiment, the mobile station 10 may be configured so that the RSRP correction unit 18 is incorporated in the RSRP measurement unit 16 in the preceding stage. Moreover, the memory 10b may be provided as an external device of the mobile station 10 and be connected to the mobile station 10 via a network or a cable.

Furthermore, in the foregoing description, individual configurations and operations were described in each of the embodiments. However, the mobile stations according to the respective embodiments may also include component members specific to other embodiments and/or modifications. Moreover, the embodiments and modifications may be combined in an arbitrary form including not only a combination of two embodiments and/or modifications, but also a combination of three or more embodiments and/or modifications. For example, the RSRP correcting function of the second embodiment may be applied to the mobile station 10 according to the first embodiment. This makes it possible to achieve more precise measurement of the RSRP value.

According to one aspect of the mobile station disclosed in this application, accuracy in measurement of the reception quality can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile station comprising:
a processor configured to:
calculate a weighting matrix for use in channel estimation of an interfering cell;
adjust values of respective components of the weighting matrix calculated so that out of the respective components, the values of diagonal components are smaller than the values of components other than the diagonal components;
suppress a noise component included in a value of the channel estimation by using the weighting matrix whose respective component values were adjusted so as to perform the channel estimation of the interfering cell; and
cancel a signal of the interfering cell from a received signal based on a result of the channel estimation and measure a reception quality of a measurement target cell with respect to the received signal.

2. The mobile station according to claim 1, wherein the processor is further configured to adjust the values of the respective components so that the values of diagonal components are set to 0.

3. A mobile station comprising:
a processor configured to:
calculate a weighting matrix for use in channel estimation of an interfering cell;
adjust values of respective components of the weighting matrix calculated so that out of the respective components, the values of diagonal components are smaller than the values of components other than the diagonal components;
suppress a noise component included in a value of the channel estimation by using the weighting matrix whose respective component values were adjusted so as to perform the channel estimation of the interfering cell;
cancel a signal of the interfering cell from a received signal based on a result of the channel estimation and measure a reception quality of a measurement target cell with respect to the received signal; and
correct the reception quality measured by the measurement unit by using a correction value calculated with use of the weighting matrix.

4. The mobile station according to claim 1, wherein a plurality of the interfering cells are present, and
the processor is further configured to:
adjust the values of the respective components for each of the plurality of interfering cells independently of each other;
perform the channel estimation with use of the weighting matrix for each of the plurality of interfering cells independently of each other; and
sequentially cancel signals of the plurality of interfering cells from the received signal based on the result of the channel estimation and measure the reception quality of the measurement target cell.

5. The mobile station according to claim 3, wherein
a plurality of the interfering cells are present, and
the processor is further configured to:
adjust the values of the respective components for each of the plurality of interfering cells independently of each other;
perform the channel estimation with use of the weighting matrix for each of the plurality of interfering cells independently of each other;
sequentially cancel signals of the plurality of interfering cells from the received signal based on the result of the channel estimation and measure the reception quality of the measurement target cell; and
correct the reception quality measured by using the correction value calculated with use of the weighting matrix.

6. A method for measuring a reception quality performed by a mobile station, the method comprising:
calculating a weighting matrix for use in channel estimation of an interfering cell;
adjusting values of respective components of the calculated weighting matrix so that out of the respective components, the values of diagonal components are smaller than the values of components other than the diagonal component;
suppressing a noise component included in a value of the channel estimation by using the weighting matrix whose respective component values were adjusted so as to perform the channel estimation of the interfering cell; and
cancelling a signal of the interfering cell from a received signal based on a result of the channel estimation and measuring a reception quality of a measurement target cell with respect to the received signal.

7. A method for measuring a reception quality performed by a mobile station, the method comprising:
calculating a weighting matrix for use in channel estimation of an interfering cell;
adjusting values of respective components of the calculated weighting matrix so that out of the respective components, the values of diagonal components are smaller than the values of components other than the diagonal component;
suppressing a noise component included in a value of the channel estimation by using the weighting matrix whose respective component values were adjusted so as to perform the channel estimation of the interfering cell;
cancelling a signal of the interfering cell from a received signal based on a result of the channel estimation and measuring a reception quality of a measurement target cell with respect to the received signal, and
correcting the measured reception quality by using a correction value calculated with use of the weighting matrix.

8. The mobile station according to claim 3, wherein the processor is further configured to adjust the values of the respective components so that the values of diagonal components are set to 0.

* * * * *